United States Patent [19]

Peden

[11] Patent Number: 5,615,325
[45] Date of Patent: Mar. 25, 1997

[54] GRAPHICAL VIEWER FOR HEIRARCHICAL DATASETS

[75] Inventor: George H. Peden, Portland, Oreg.

[73] Assignee: Intel Corporation, Santa Clara, Calif.

[21] Appl. No.: 314,702

[22] Filed: Sep. 29, 1994

[51] Int. Cl.$^6$ .................................................. G06F 3/14
[52] U.S. Cl. .............................. 395/326; 395/356
[58] Field of Search ................................ 395/133, 155, 395/156, 157, 158, 159, 160, 161, 600, 650

[56] References Cited

U.S. PATENT DOCUMENTS

| | | | |
|---|---|---|---|
| 5,005,119 | 4/1991 | Rumbaugh et al. | 395/650 |
| 5,241,673 | 8/1993 | Schelvis | 395/600 |
| 5,404,428 | 4/1995 | Wu | 395/133 |

*Primary Examiner*—Thomas G. Black
*Assistant Examiner*—Ruay Lian Ho

*Attorney, Agent, or Firm*—Blakely, Sokoloff, Taylor & Zafman

[57] ABSTRACT

A spokes viewer displays hierarchical datasets, that contain a plurality of base data elements, on an output display. The hierarchical dataset is arranged in at least two hierarchical levels. A plurality of nodes are generated, one for each of the base data elements, such that the nodes represent view data for displaying the hierarchical datasets. The view data is displayed, in an acyclic graphical representation, on the output display. A hub node, which represents a first level of the hierarchical dataset, is disposed in a center position, and spoke nodes, which represent the next lower level of the hierarchical dataset, are displayed radially outward from the hub node to form spokes about the hub node. The spokes viewer permits customization of a particular view through modification, annotation, and attribution of the view data. If the view data is modified to customize a particular view, the original dataset is unchanged, such that the graphical depiction of the view data is separate from the base data. The modified view is stored so that multiple views of a single dataset may persist.

18 Claims, 17 Drawing Sheets

GRAPHICAL VIEWER FOR HEIRARCHICAL DATASETS

FIELD OF THE INVENTION

The present invention relates to the field of graphical user interfaces, and more particularly to methods and apparatus for displaying hierarchical datasets.

BACKGROUND OF THE INVENTION

FIG. 1 illustrates a prior art dataset viewer for a computer file system. The dataset viewer is a display for a file manager program, manufactured by Microsoft® Corporation. As shown in FIG. 1, the file manager data viewer utilizes a simple tree approach to visualize hierarchical data structures. For the prior art dataset viewer example illustrated in FIG. 1, a tree structure display of a disk operating system (DOS) file system is shown. Specifically, the tree structure displays, for example, a bakerco file directory representing a high level directory, with several subdirectories or files displayed in an indented fashion to show a second level contained within the bakerco file directory. The tree structure utilizes the same indented approach to show additional subdirectories and files.

Although the tree structure technique is well suited to view the details of a specific region of data, the tree approach does a poor job of representing a view of the entire dataset. For example, for a file system having many files in a subdirectory that is contained in a main directory also having multiple of files, the high level directory is not displayed when the specific contents of the subdirectory are shown. Therefore, the tree structure can be characterized as having a high aspect ratio between the actual data shown and the entire view of the dataset. This high aspect ratio of the view causes a tunnel vision effect, such that only a narrow view of the local data in the area of interest is shown. Therefore, it is desirable to provide a view of hierarchical datasets that permit viewing of both local datas and the entire dataset.

In addition to the poor aspect ratio obtained by using the tree structure, the tree structure has additional limitations. Typically, a computer programmer or database manager works on a part of a dataset at any one particular time. In the traditional tree structure, the view is fixed regardless of the requirements of the user viewing the dataset. Therefore, a user is required to adapt the view to their work, rather than changing the view to suit the needs of the user. Consequently, it is desirable to permit a user to adapt and change the view of a hierarchical dataset according to the particular needs of that user.

In addition to being fixed, the view is also temporal. Even if a user is able to change the view, there is no way to save the particular view changed. In this information age, it is imperative that work can be leveraged from the work of others. Therefore, it is desirable to permit the customized view to persist even after the application program is halted. By allowing a view to persist, a user can utilize the view that was built previously, or a user can utilize a view built by someone else, thus building a cooperative knowledge within a particular work group.

SUMMARY AND OBJECTS OF THE INVENTION

Therefore, it is an object of the present invention to display datasets local to the area of user interest that provides a wide view of the entire dataset.

It is another object of the present invention to provide the user with an adaptable view to suit the particular requirements of the user.

It is a further object of the present invention to permit saving a user created view for use and modification at a later time.

These and other objects of the present invention are realized in a spokes viewer that displays hierarchical datasets on an output display, such as a computer output display. The spokes viewer operates on a hierarchical dataset that includes a plurality of base data elements. The hierarchical dataset is arranged in at least two hierarchical levels. A plurality of nodes are generated, one for each of the base data elements, such that the nodes represent view data for displaying the hierarchical datasets. The view data is displayed, in an acyclic graphical representation, on the output display. A hub node, which represents a first level of the hierarchical dataset, is disposed in a center position, and spoke nodes, which represent the next lower level of the hierarchical dataset, are displayed radially outward from the hub node to form spokes about the hub node.

The spokes viewer permits customization of a particular view through modification, annotation, and attribution of the view data. If the view data is modified to customize a particular view, the original dataset is unchanged, such that the graphical depiction of the view data is separate from the base data. The modified view is stored as a file so that multiple views of a single dataset may persist.

A user enters annotation data to annotate a particular view of a dataset. The spokes viewer generates new view data from the annotation data and the base data elements. The annotation data includes text and symbols, such as circling data items, for annotating nodes. A user also enters attribution data including specifying attribution characteristics and identifying base data elements for modification. The attribution characteristics include font type, font size, bold text, italic text, and underline text. The spokes viewer further contains functions to allow a user to modify the view, such as lengthening spokes, shortening spokes, rearranging spokes, and repositioning spokes on the output display.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

Figure 1:
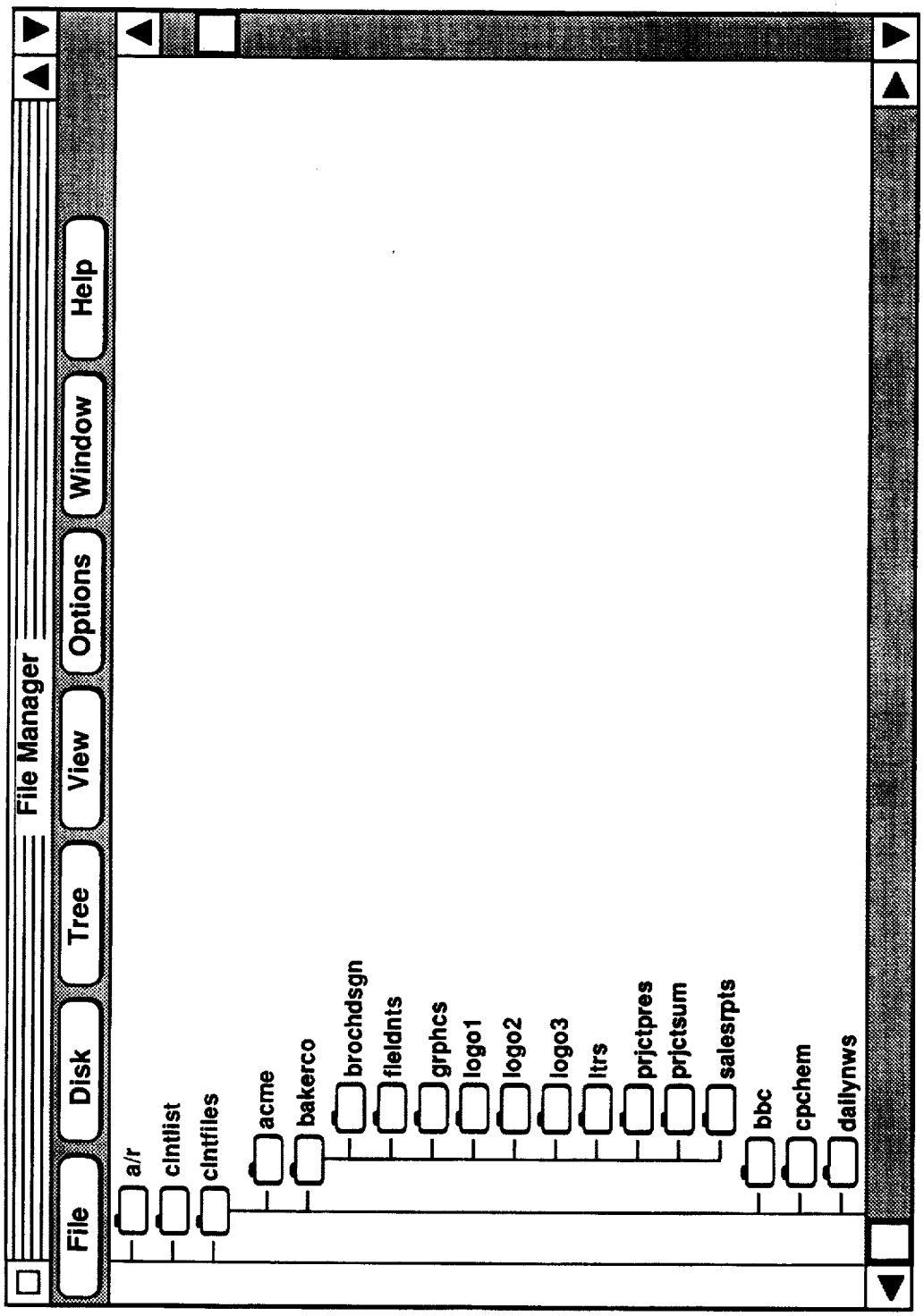
FIG. 1 illustrates a prior art dataset viewer for a computer file system.
Figure 2:
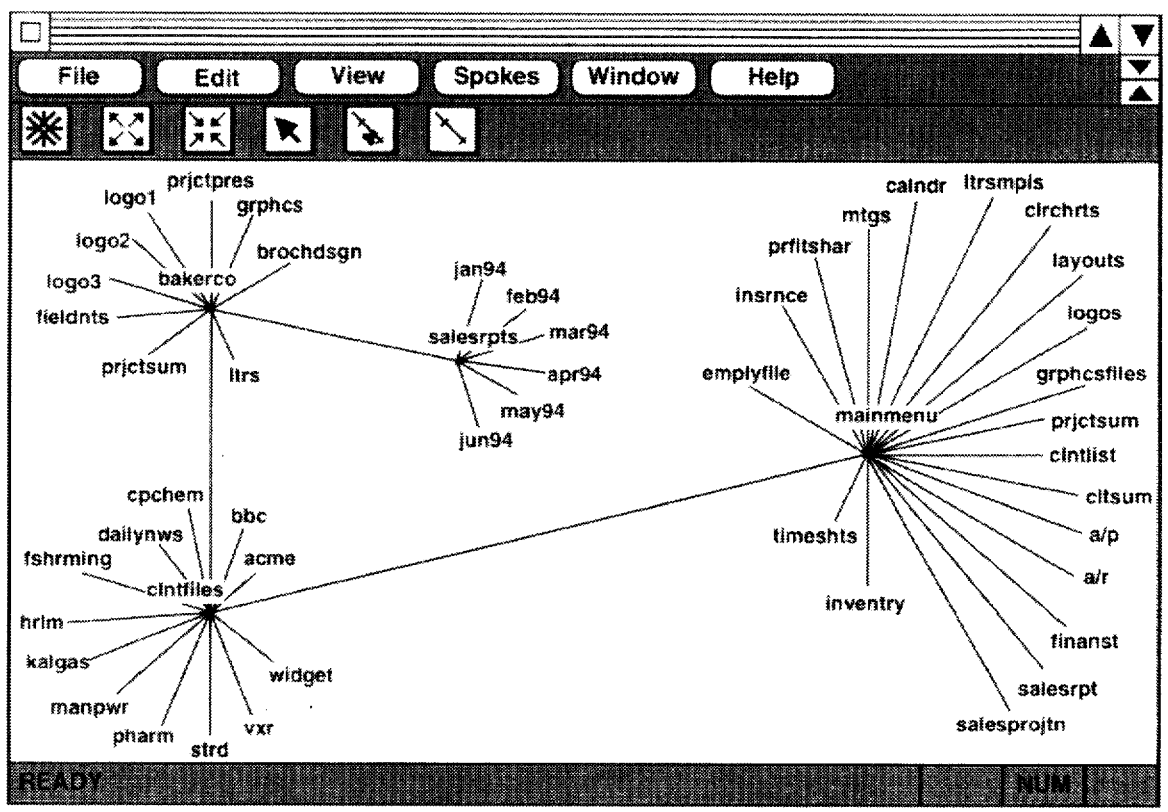
FIG. 2 illustrates an example of the spokes viewer for a hierarchical dataset configured in accordance with the teachings of the present invention.

FIG. 2 illustrates an example of the spokes viewer for a hierarchical dataset configured in accordance with the teachings of the present invention. As shown in FIG. 2, the spokes viewer utilizes a directed acyclic graph technique to represent hierarchical datasets. The example dataset illustrated in FIG. 2 contains a complete view of the dataset illustrated in FIG. 1 in the tree structure. Note that the window area for the tree structure example illustrated in FIG. 1 only displays a portion on the dataset. However, the dataset illustrated in FIG. 2 utilizing the spokes viewer of the present invention is capable of displaying substantially more of the dataset.

The spokes viewer displays a first hierarchical structure as a "hub" or center, and displays a subsequent lower level as spokes coupled to the center hub. For the example illustrated in FIG. 2, the mainmenu directory is viewed as a hub in the spokes viewer, and the files and subdirectories contained within the mainmenu directory, such as emplyfile, insrance, etc., are viewed as spokes emanating from the mainmenu directory hub. In addition, the clntfiles subdirectory, contained within the mainmenu directory, is displayed as a hub with a number of files displayed as spokes originating from the clntfiles subdirectory.

In order to show an additional level of the hierarchical dataset, the bakerco subdirectory, contained within the clntfiles subdirectory, is also depicted as a hub. Within the bakerco directory, several files are viewed as spokes coupled to the bakerco subdirectory hub. The example illustrated in FIG. 2 also shows a fourth level of the dataset, the salesrpts subdirectory, displayed as a hub and contained within the bakerco subdirectory. The salesrpts subdirectory also contains several files depicted as spokes coupled the salesrpts subdirectory.

The spokes viewer displays the hierarchical dataset to maintain reasonable aspect ratios for high branching datasets. As shown in FIG. 2, four levels of the hierarchical dataset are viewed without scrolling the screen. Therefore, the spokes viewer of the present invention provides good utilization of scarce computer display screen resources. If the spokes viewer is viewed in comparison with the tree structure illustrated in FIG. 1, the spokes viewer displays more information, while maintaining the hierarchical nature of the datasets.

In addition, the spokes viewer reinforces the relative positions of data elements in the dataset so as to permit the user to remember the location of the data elements within the dataset. As is explained more fully below, the spokes viewer technique of the present invention permits a user to arrange datasets in a fashion that the user can best recall the locations of the data elements. For example, one may remember that a grocery store is next to the main street next to the post office. Similar types of recognition may be used when constructing the spokes viewer for a particular dataset.

In general, the spokes viewer of the present invention provides improved viewing capabilities through directed acyclic graphs, dynamic data relationships and user definable attribution. The spokes viewer allows the user to view and manipulate large datasets in a manner that is dependent upon the particular uses of the data, rather than the static predefined hierarchies and attributes. In addition, the spokes viewer of the present invention permits the user definable views to be persistent over time, allowing users to spend more time utilizing the information rather than searching through traditional tree structure datasets. The spokes viewer is not dependent on a specific dataset, nor is it dependent on specific hierarchies or relationships. Although the present invention is described in conjunction with a DOS file system, comprising directories, subdirectories, and files, any dataset may be viewed utilizing the spokes viewer of the present invention without deviating from the spirit or scope of the invention.

For purposes of explanation, several definitions are provided for the spokes viewer. Base data is defined as the underlying data utilized in the spokes viewer. For example, the base data may comprise a DOS file system, a news group, a message forum for an on-line computer bulletin board, etc. For any particular dataset, the base data contains a plurality of base elements. In order to display the base data in accordance with the spokes viewer, nodes are derived from each base data element. Therefore, each base data element comprises a node in the spokes viewer domain. The nodes are the fundamental building blocks to generate view data for display by the spokes viewer. The view data contains, in addition to the nodes, annotation data. Annotation data is not derived from a base data element. The use of annotation data and the generation of view data is described more fully below.

The spokes viewer of the present invention utilizes the inherent relationships and attributes of the base data elements as the basis for the view data. However, the view data generated by the spokes viewer is decoupled from the base data. The decoupling of the base data from the view data allows the user to modify the representation of the view data without changing the base data. In addition, the separation of the view data and the base data allows multiple views of a single base dataset. A view may be modified in many ways. For example, the user may move nodes around, change relationships, trim subtrees, etc.

In addition to modifying the structural representation to the view, the spokes viewer permits the user to specify and highlight important items in the dataset, known as attribution. The spokes viewer also permits annotation of the base dataset. The annotation allows additions to the view data that are not part of the base dataset. Examples of annotations are work notes, modification logs, etc. The spokes viewer also permits persistence of a created view. As discussed above, the key strength of work groups is group memory (e.g. leveraging off of past work rather than starting from scratch). In this way, the spokes viewer allows data views to be saved, modified, and reused.

The spokes viewer of the present invention has application for use in the information domain. The spokes viewer may be utilized as an element in products such as personalized news casts, Internet information managers, corporate databases, etc. In general, the spokes viewer may be used in any application that is designed to facilitate the browsing and exploring of information datasets.

Figure 3:
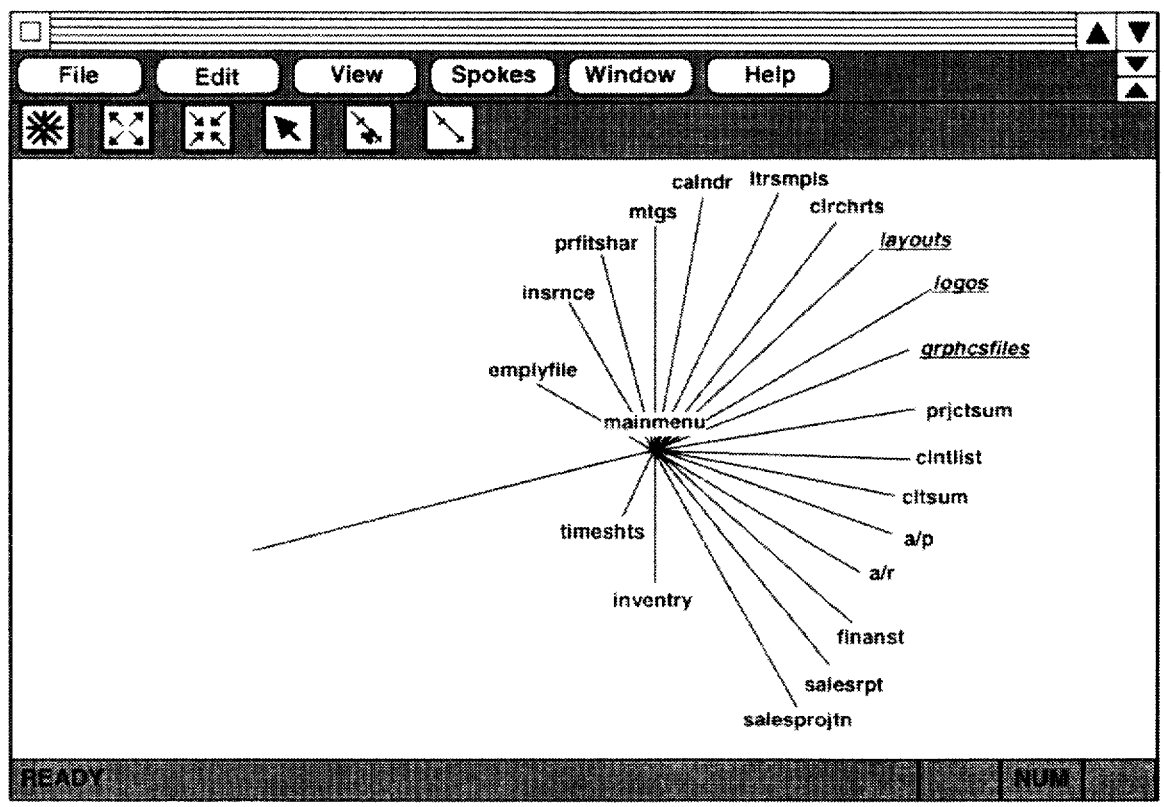
FIG. 3 illustrates an example of attribution for the spokes viewer.

FIG. 3 illustrates an example of attribution for the spokes viewer of the present invention. As shown in FIG. 3, in addition to standard windows menus, a spokes pull down menu 75 is provided. The spokes pull down menu 75 permits a user to select an attribution function (not shown). In one embodiment for a Windows™ implementation of the spokes viewer, a standard Windows™ dialog box is utilized to input information pertaining to the attribution function. For the example illustrated in FIG. 3, the files layouts, logos, and grphcsfiles are italicized and underlined. The highlighted nodes are used by a user to denote special meaning. For example, the highlighted files shown in FIG. 3 may illustrate that these files have not been completely debugged by the user/programmer. The text may also be highlighted by changing the font, the font size, displaying the text in bold, etc.

Figure 4:
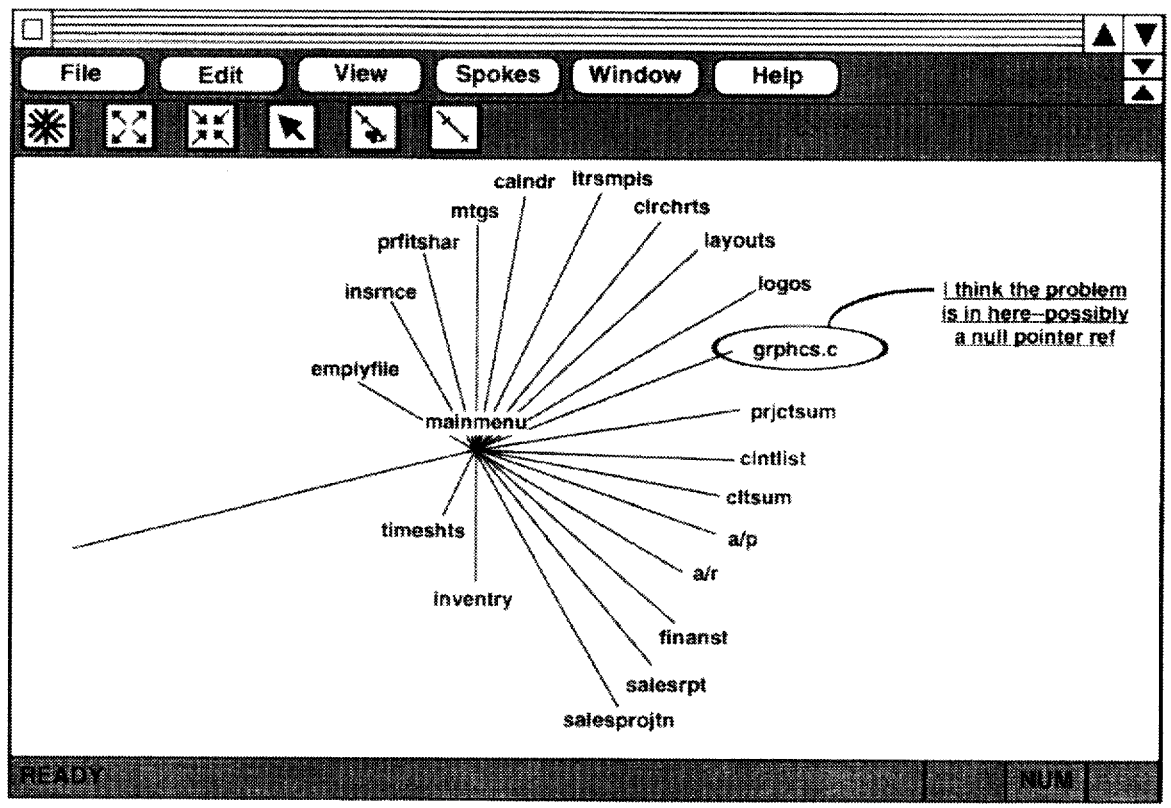
FIG. 4 illustrates an example for annotating view data configured in accordance with the spokes viewer of the present invention.

FIG. 4 illustrates an example for annotating view data configured in accordance with the spokes viewer of the present invention. As discussed above, the spokes viewer permits separation of the base data and the view data. The spokes pull down menu 75 permits the user to select an annotation function (not shown). In one embodiment for the spokes viewer implemented within Windows™, a dialog box is utilized to input the additional view data. The annotation function permits a user of the spokes viewer to make notes, or annotations, that are not part of the original base data. For the example shown in FIG. 4, the node grphcs.c is circled, and the text "I think the problem is in here-possibly a null pointer reference," is entered. A user may display the dataset at a subsequent time, and the note reminds the user that the problem may lie in the grphcs.c routine.

Figure 5A:
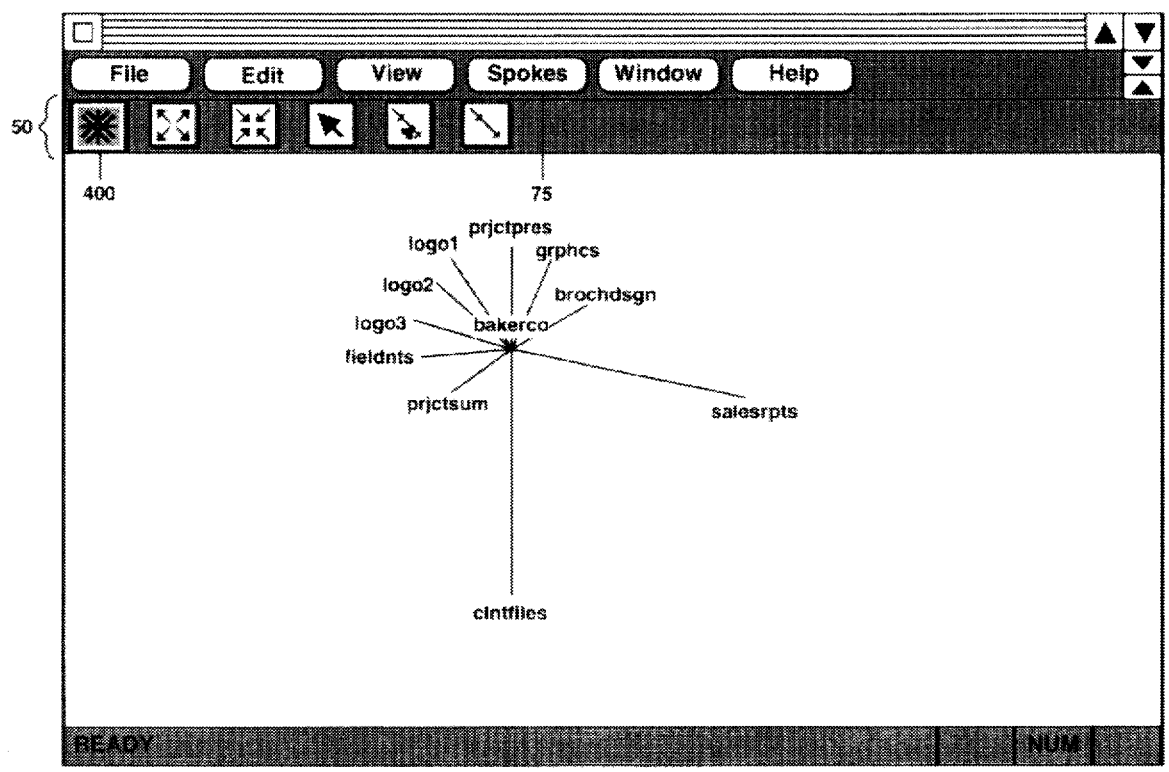
FIGS. 5a and 5b illustrate a spokes equivalent function to modify the spokes view.
Figure 5B:
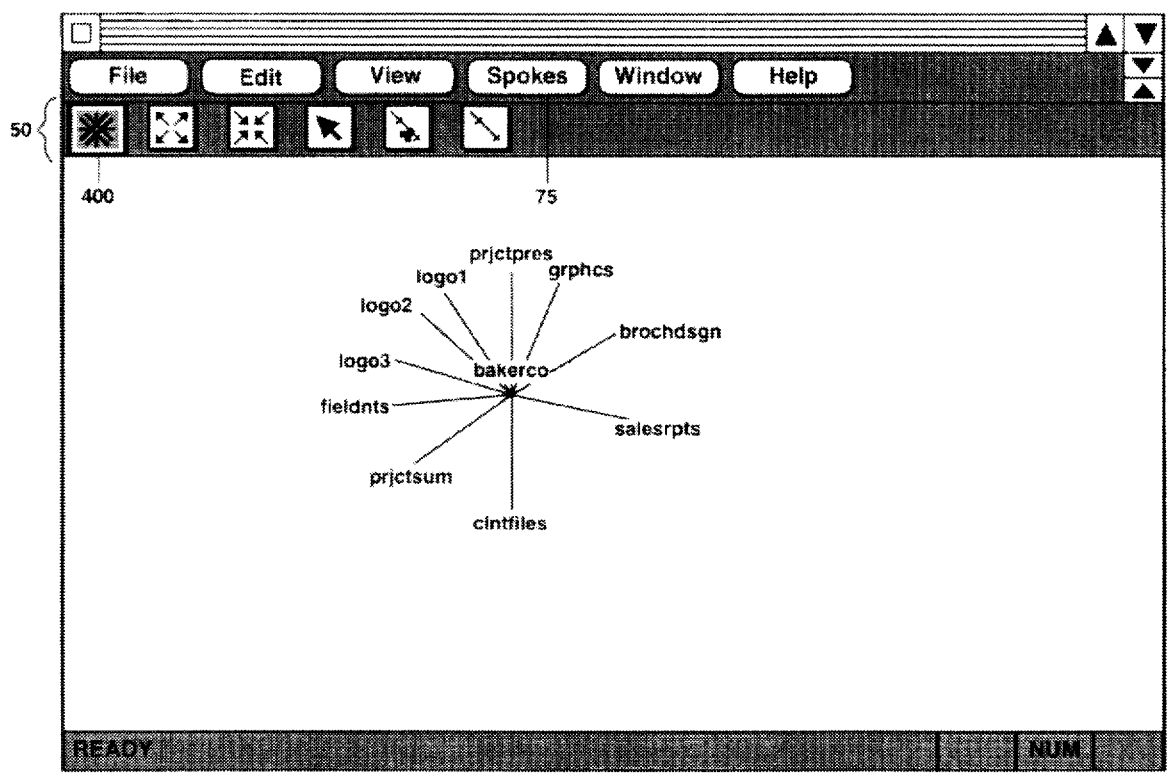

As discussed above, the user of the spokes viewer has the ability to create unique view data customized for a particular application. In one embodiment, modification of the view is achieved by selecting functions via an icon located on the menu bar, or by selecting a function from the spokes pull down menu 75. FIGS. 5a and 5b illustrate a "spokes equivalent" function to modify the spokes view. A spokes equivalent icon 400, located on the menu bar 50, is utilized to expand all spoke nodes selected to an equal distance. For example, for the dataset illustrated in FIG. 5a, one center hub node is coupled to a plurality of spoke nodes. A user may desire to make the spoke nodes unequal distances in order to emphasize or highlight some spoke nodes from other spoke nodes. By selecting the spokes equivalent function from either the menu bar icon or spokes pull down menu, the spoke nodes are set to an equal distance as shown in FIG. 5b.

Figure 6A:
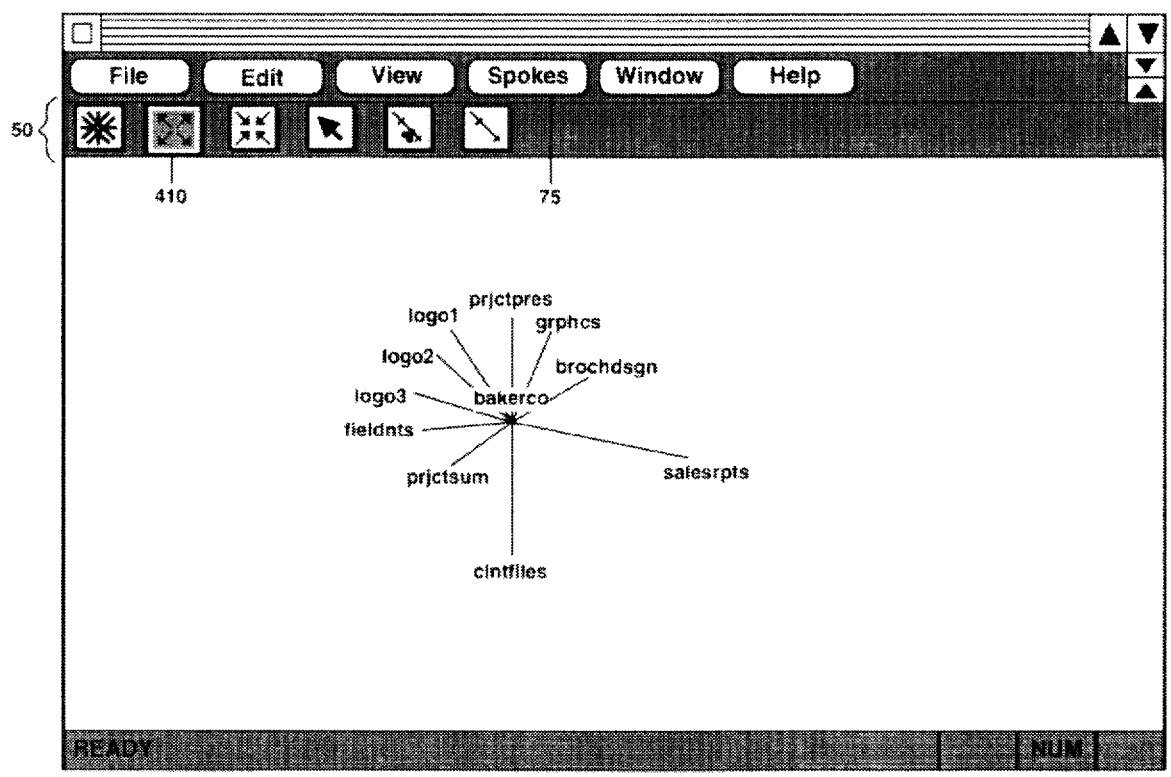
FIGS. 6a and 6b illustrate an example for a spokes expand function for the spokes viewer.
Figure 6B:
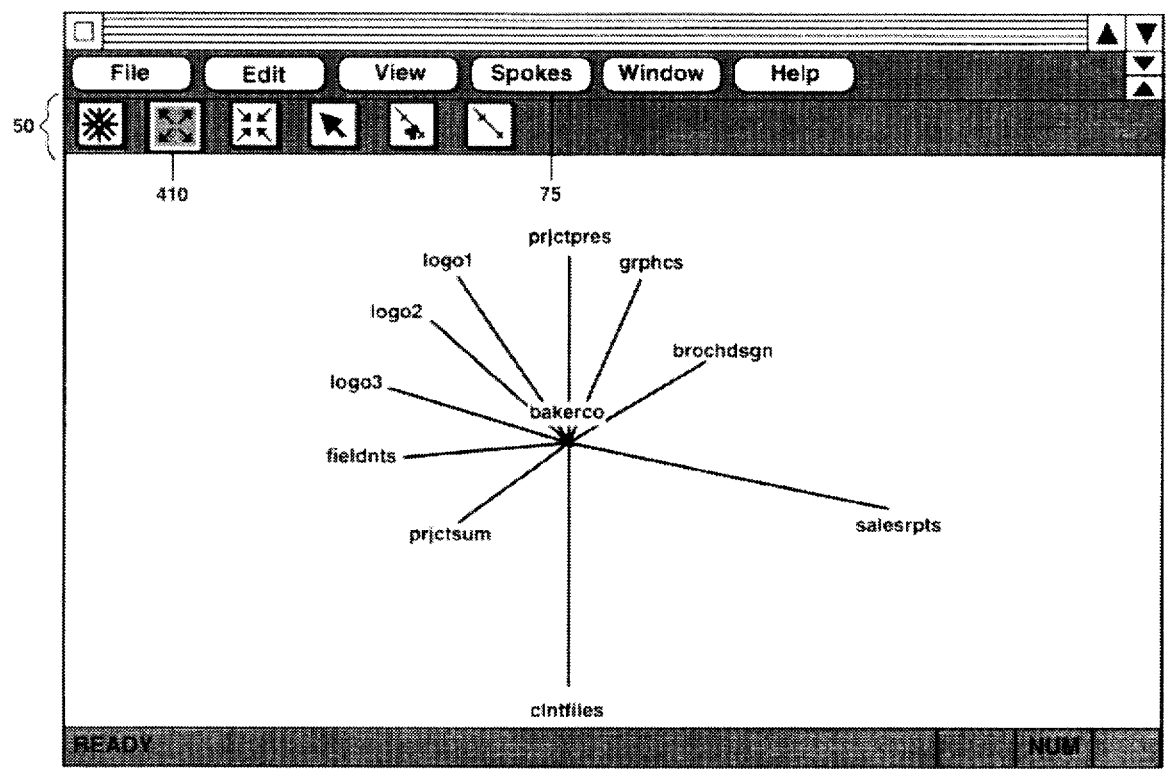

FIGS. 6a and 6b illustrate an example for a spokes expand function for the spokes viewer of the present invention. The spokes expand function may be selected on the menu bar from either a spokes expand icon 10, or from the spokes expand function on the pull down spokes menu 75. When invoked, the spokes expand function increases the length of the selected spoke nodes. If all spokes associated with a common hub are selected, then all spokes are extended in length. FIG. 6b illustrates spokes nodes that have been expanded via the spokes expand function from the spoke lengths illustrated in FIG. 6a. The spokes expand function may be configured to increase the length of the selected spokes any distance desired.

Figure 7A:
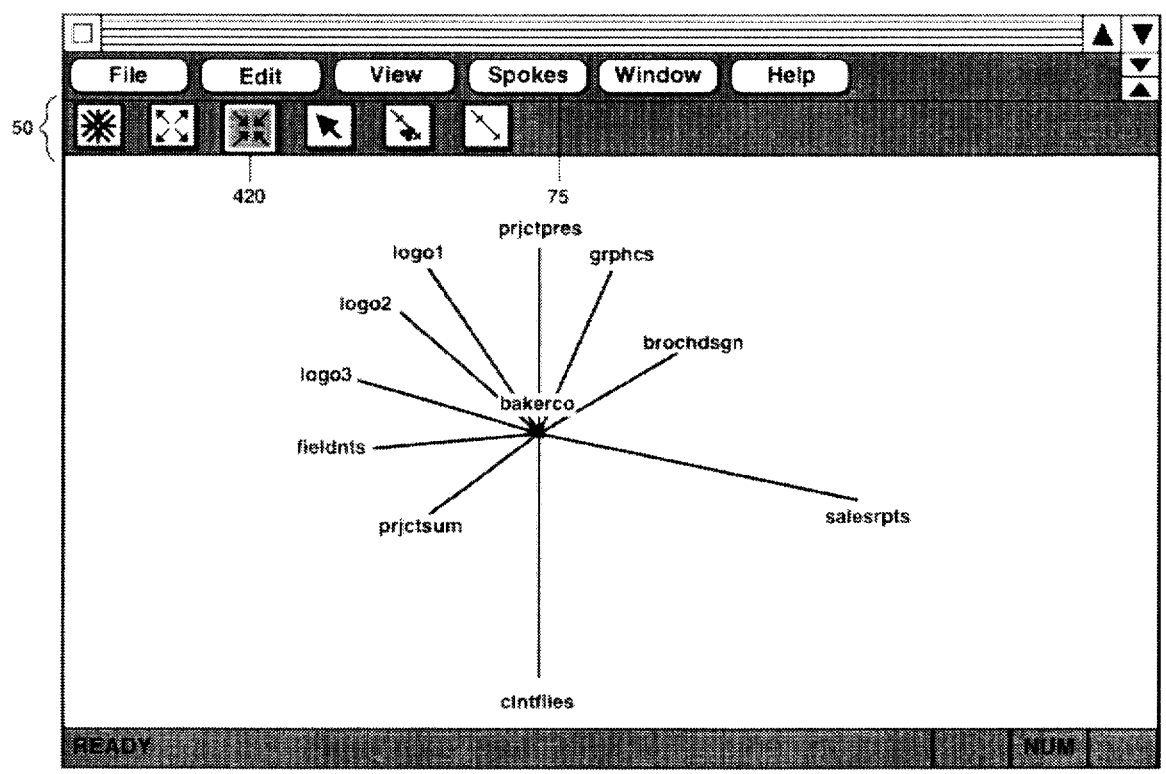
FIGS. 7a and 7b illustrate an example for a contract spokes function for the spokes viewer of the present invention.
Figure 7B:
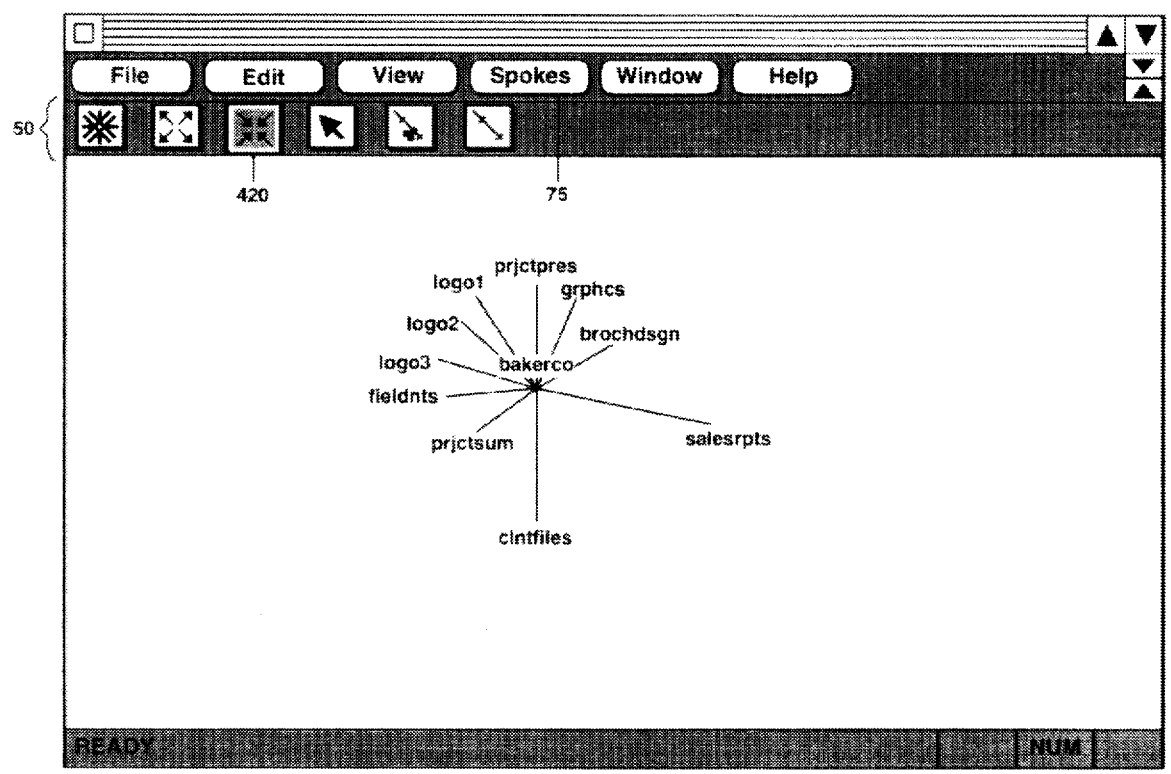

FIGS. 7a and 7b illustrate an example for a contract spokes function configured in accordance with the spokes viewer of the present invention. The contract spokes function is selectable from either a contract spokes function icon 420 or from selecting the contract spokes function on the spokes pull down menu 75. In general, the contract spokes function shortens the length of selected spokes nodes. For the example illustrated in FIGS. 7a and 7b, the entire bakerco subdirectory, including the hub node and the spokes nodes, are selected. FIG. 7b illustrates spokes nodes that have been shorten via the spokes contract function from the spoke lengths illustrated in FIG. 7a. The spokes contract function may be configured to decrease the length of the selected spokes any distance desired.

Figure 8A:
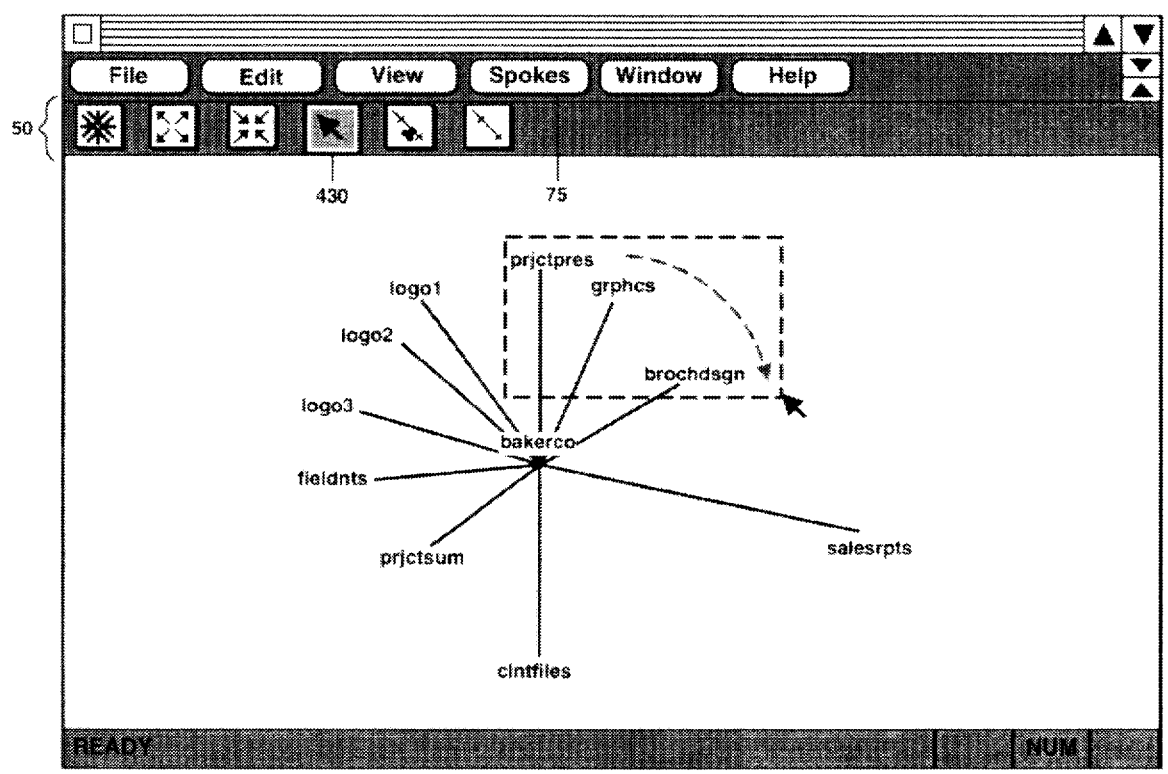
FIGS. 8a and 8b illustrate an example of the select function for the spokes viewer of the present invention.
Figure 8B:
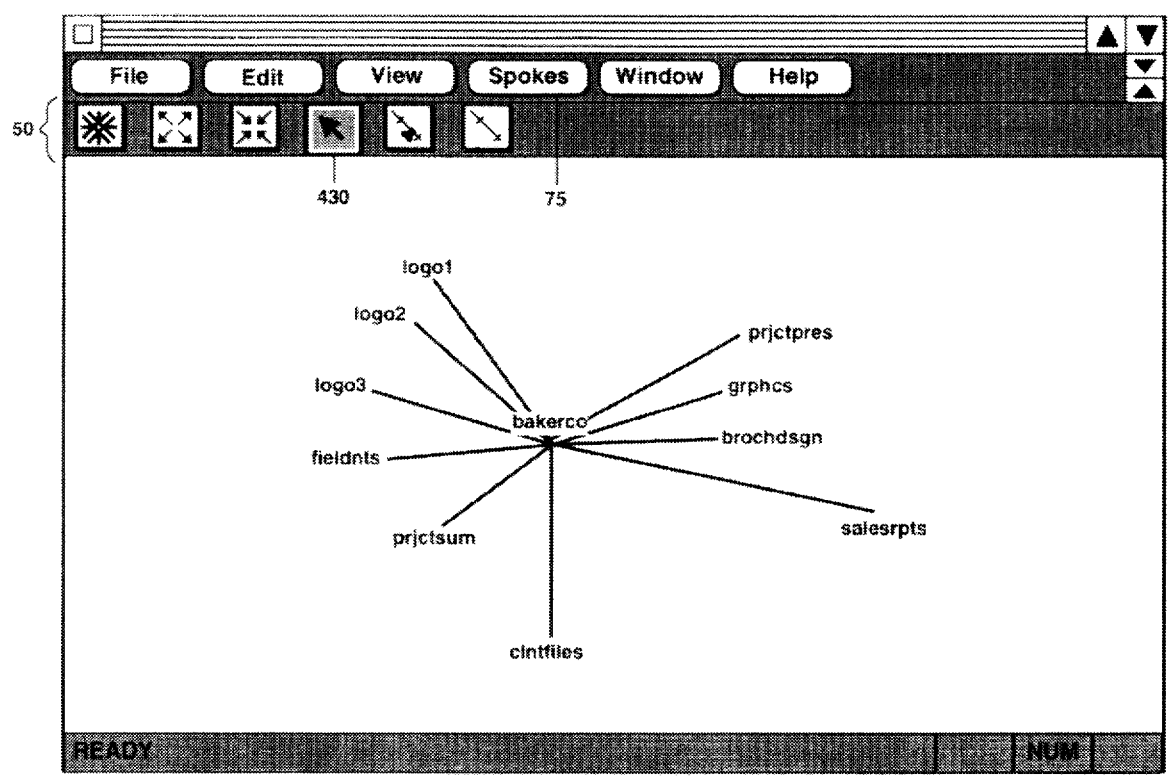

FIGS. 8a and 8b illustrate an example of the select function for the spokes viewer of the present invention. In general, the select function permits a user to modify the spokes view to create a customized view of the dataset. The select function is invoked from either the select icon 430 on the menu bar 50, or from the pull down spokes menu 75. A user may select any portion of the view data for modification by using a cursor. Specifically, in one embodiment, a portion of the spokes view is selected, after invoking the select function, by the user holding down a button on the cursor control device to enclose a portion of the spokes view as shown by the dashed rectangle enclosure on FIG. 8a. The user releases the button on the cursor control device to select the enclosed area. For the example illustrated in FIG. 8a, the spoke nodes prjctpres, grphcs, and brochdsgn are selected for modification. By dragging the cursor on the display screen, the user may move the selected spoke nodes to any position. The user exits the select function to modify the spokes view.

For the example illustrated in FIG. 8a, the spokes nodes prjctpres, grphcs, and brochdsgn are moved in a clockwise direction. A user may desire to move the spoke nodes to such a position in order to separate spoke nodes for a desired grouping. In addition to moving the spokes nodes in a clockwise or a counter-clockwise direction, spoke nodes may be lengthened and shortened through the use of the select function. In order to lengthen or shorten spokes nodes, the desired spokes nodes are selected by invoking the select function, and the user subsequently drags the end of the selected spokes nodes to achieve the desired length. Furthermore, the select function permits movement of a hub node and the corresponding spokes nodes for placement on a different portion of the screen display in the same manner described for the example shown in FIGS. 8a and 8b.

Figure 9A:
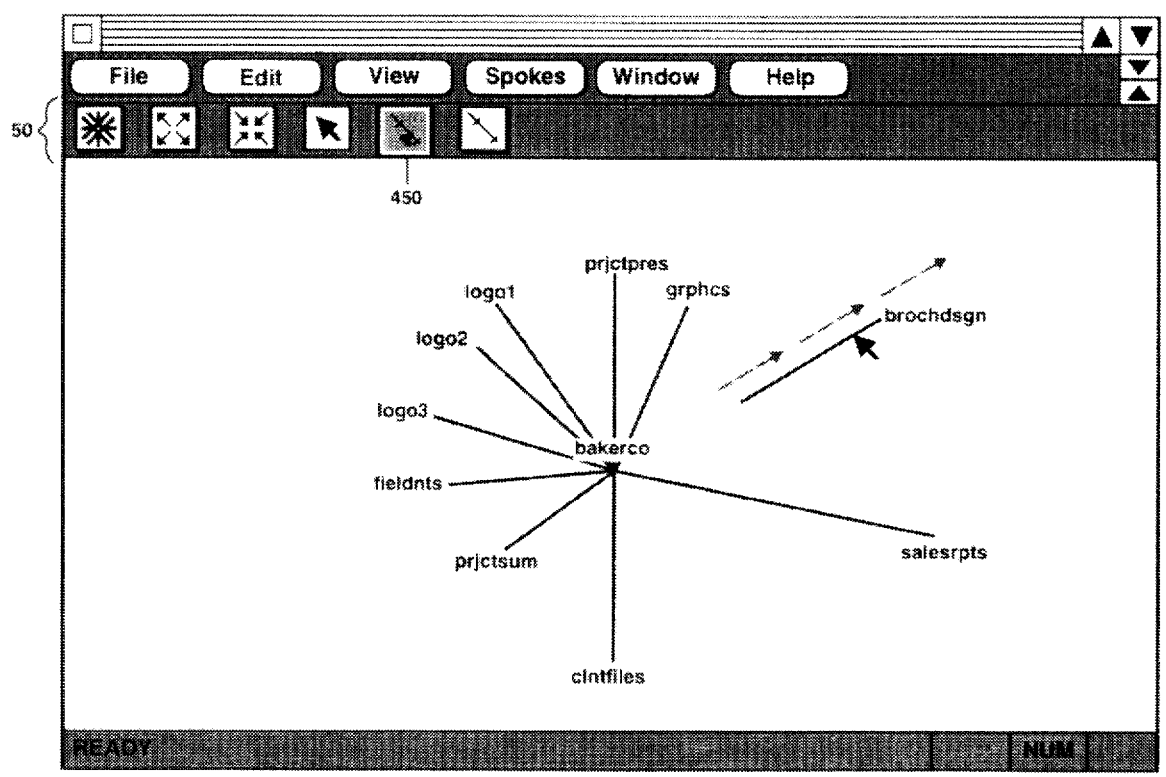
FIGS. 9 and 9b illustrate a disconnect node and a connection node functions for the spokes viewer.

FIG. 9a illustrates a disconnect node function for the spokes viewer. A disconnect node function is selectable from the spokes pull down menu 75 or from a disconnect node icon 450. In general, the disconnect node function severs selected spokes node from the corresponding hub, or the disconnect node severs two hub nodes. Upon invoking the disconnect node function, a user uses the cursor to place the node in a new location in the same manner that nodes are manipulated using the select function.

Figure 9B:
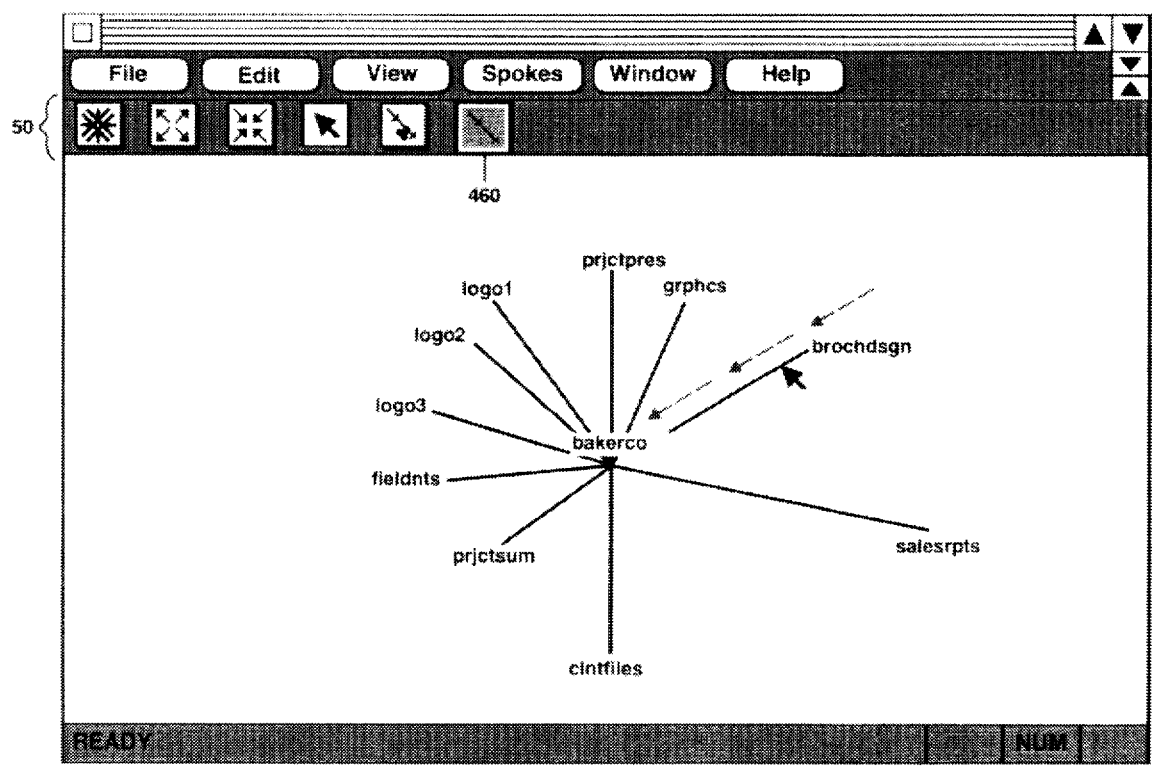

FIG. 9b illustrates a connect node function for the spokes viewer. A connect node function is selectable from the spokes pull down menu 75 or from a connect node icon 460 located on the menu bar 50. The connect mode connects a selected node to a hub node. The user manipulates the node for connection in the same manner that nodes are manipulated using the select function.

Figure 10:
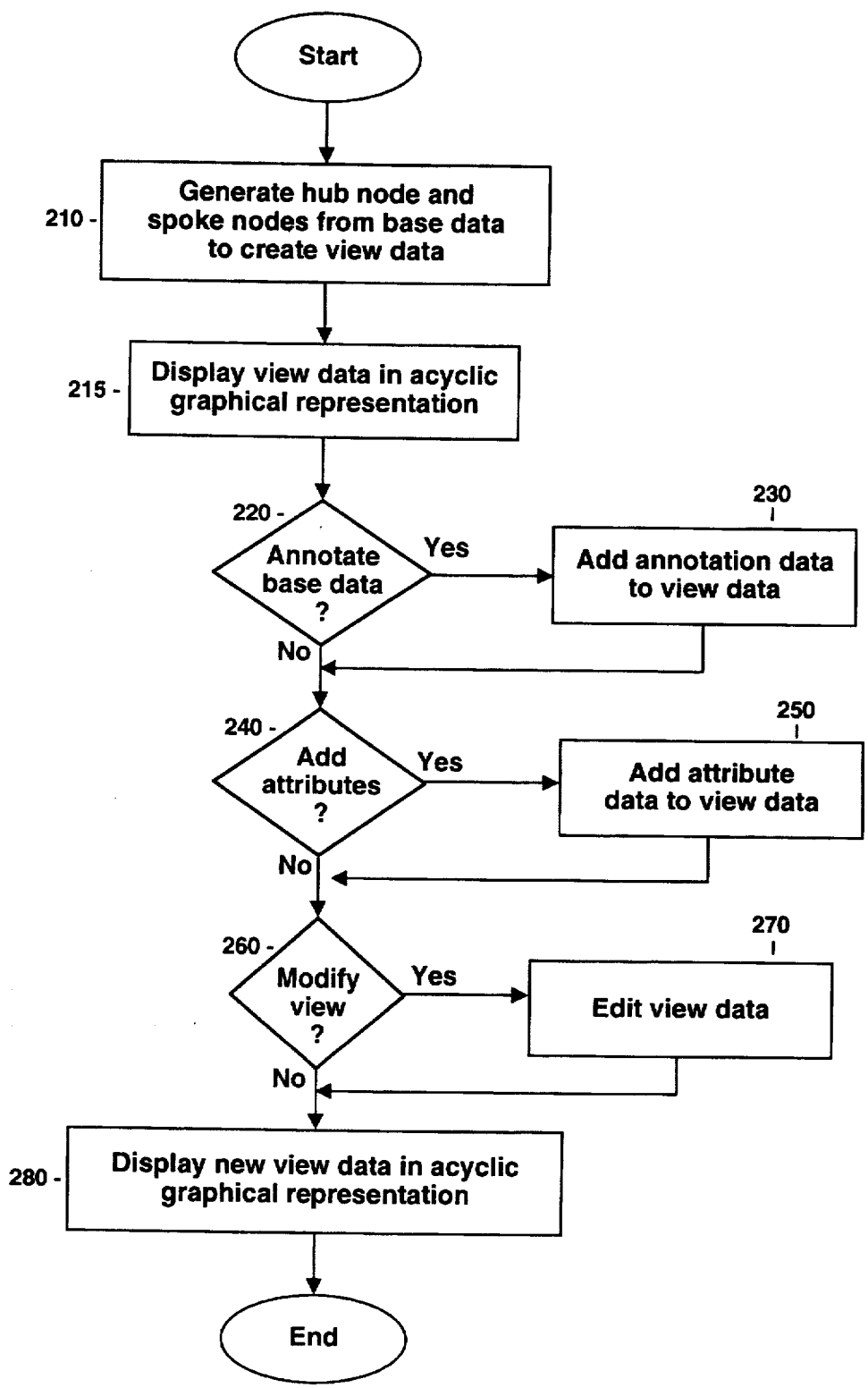
FIG. 10 is high level flow chart illustrating the method of displaying hierarchical datasets in accordance with the spokes viewer of the present invention.

FIG. 10 is high level flow chart illustrating the method of displaying hierarchical datasets in accordance with the spokes viewer of the present invention. A hierarchical dataset represents the base data for display by the spokes viewer. In block 210, hub nodes and spoke nodes are generated from the base data to create view data. The view data is displayed in an acyclical graphical representation based on the base data as shown in block 215. If the user desires to annotate the base data, then annotation data is entered, and added to the view data as shown in blocks 220 and 230. If the user desires to add certain attributes to the view data, then the user adds attribute information, and the attribute information is added to the view data as shown in blocks 240 and 250. In addition, if the user desires a specific arrangement of the spokes view, then the user may edit the view data to obtain the particular customized display desired. The view data is displayed in an acyclical graphical representation based on the hub nodes, spoke nodes, annotation data, attributes, and any modifications made by the user.

Figure 11:
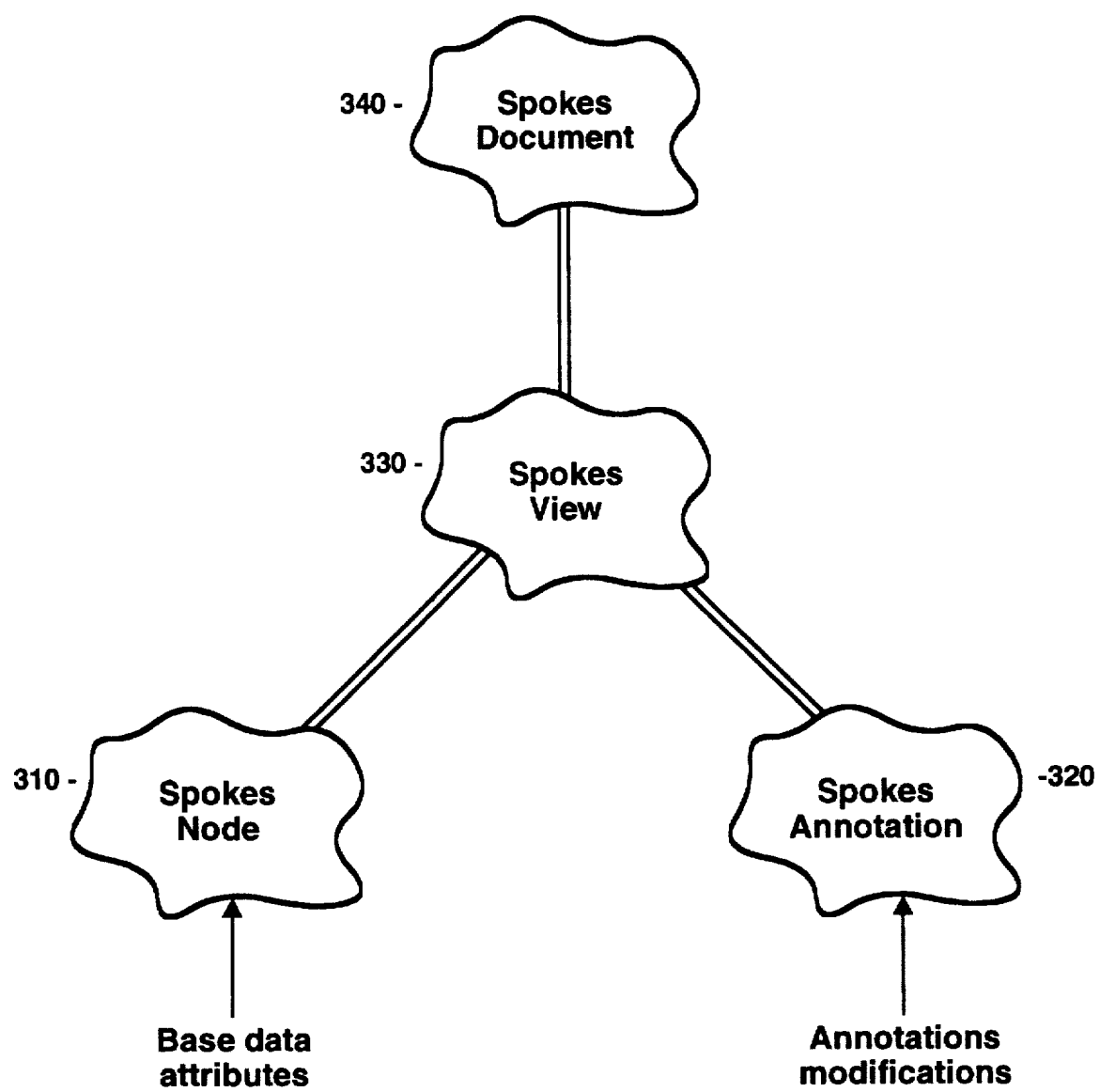
FIG. 11 illustrates one embodiment of a high level software abstraction for implementing the spokes viewer of the present invention.

FIG. 11 illustrates one embodiment of a high level software abstraction for implementing the spokes viewer of the present invention. As shown in FIG. 11, the spokes viewer contains, as key abstractions, spokes node 310, spokes annotation 320, spokes view 330 and spokes document 340. In general, the spokes document 340 manages nodes and annotations. The spokes document 340 provides the functionality to retrieve and save spokes views. The spokes document 340 stores view data based on the base data, and provides the functionality to modify the underlying base data in response to changes in the view.

In general, the spokes view 330 allows the user to manipulate the base data. Operations of the spokes view 330 include rearranging nodes, reparenting nodes, trimming nodes from the view, changing attributes of a node, and annotating the view. In general, the spokes node 310 represents a single element of base data. The spokes node specifies data specific information (file name, story, etc.), attributes (font, color, etc.), as well as location and relationship information. The spokes annotations 320 operates on objects that are not inherent in the base data. For example, the annotation data may be associated with a node, or may be attached as a general annotation. Examples of annotations are text, circles, rectangles, lines, audio, video, hypertext, hypertext mark up language (HTML) and object linking embedding (OLE) annotations.

Tables 1–5 define class specifications for the key abstractions shown in FIG. 11. The class specifications include a class for spokes document, a class for spokes view, a class for spokes object, a class for spokes node, and a class for spokes annotation. The class for spokes document provides the functionality for managing datasets. A spokes document class is built for each dataset to be viewed with the spokes viewer. The spokes document class allow spokes to manipulate data without affecting the underlying dataset. Table 1 shows the member variables and the modifier operations for the spokes document class. Note that the spokes document class operates on adding and removing nodes, changing attributes, and saving views.

TABLE 1

| Group | Name | Description |
|---|---|---|
| Member Variables | m_pTopLevel | List of top level nodes |
| | m_pDefaultFont | Default font |
| | m_pActive | List of active nodes |
| Modifier Operators | AddActive | Add anode to the active list |
| | RemoveActive | Remove a node from the active list |
| | ClearActive | Remove all nodes |

TABLE 1-continued

| Group | Name | Description |
|---|---|---|
| | | from active list |
| | SetActiveAttribute | Change attribute of all nodes in active list |
| | Find | Find a node given search criteria |
| | Paint | Repaint the data set |
| | Save | Save data as persistent view |
| | Open | Open saved view |

Table 2 defines a spokes view class in accordance with one embodiment for implementing the spokes viewer of the present invention. The spokes view class provides functionality to directly manipulate datasets. As shown in Table 2, the spokes view class includes member variables and modifier operations. A description is provided for the member variables and the modifier operations.

TABLE 2

| Group | Name | Description |
|---|---|---|
| Member Variables | m_pFocus | CSpNode object that has focus |
| | m_xState | Current state (Grabbing, Selecting, etc.) |
| | m_pSelectRect | Selection Rectangle |
| Modifier Operators | Annotate | Insert annotation with current tool |
| | Trim | Remove subtree from view |
| | Reparent | Reparent node |
| | ChooseFont | Set font of all active nodes |
| | ChooseColor | Set color of all active nodes |

Table 3 defines a spokes object class in accordance with one embodiment for implementing the spokes viewer. The spokes object class is a base class for spokes objects. The spokes object class includes member variables and modifier operations. Table 3 lists the members variables and the modifier operations, including descriptions.

TABLE 3

| Group | Name | Description |
|---|---|---|
| Member Variables | m_pDocument | Pointer to CSpDoc object which 'owns' this node |
| | m_pParent | The CSpNode parent of this node |
| | m_Grid | Absolute |
| | m_Polar | Relative (Azimuth, Range) of this node relative parent node. NULL if this is a top level node. |
| | m_Extent | Rectangular region which defines the 'hot spot' of this node. Used for selection and movement. |
| | m_fShowChildren | Flag specifying whether to render children of this node. |
| Modifier Operators | Reparent | Attach to parent node. |
| | Find | Find a node given search criteria |
| | Move | Set the position |
| | ArrangeTree | Arrange child nodes |

TABLE 3-continued

| Group | Name | Description |
| --- | --- | --- |
| | Expand | Expand range of children |
| | Paint | Render object |

Table 4 defines a spokes node class in accordance with one embodiment for implementing the spokes viewer. The spokes node class specification provides no specific attributes and operations. The spokes node class includes member variables, modifier operations, and selector operators. The member variables, modifier operations and selector operators, including descriptions, are also shown in Table 4.

TABLE 4

| Group | Name | Description |
| --- | --- | --- |
| Member Variables | m_fActive | Flag denoting that this node is in the active set of data members. Used to set attributes of collection of nodes (fonts, color, etc.) |
| | m_fFocus | Flag denoting that this node has the focus (current node of interest) |
| | m_pFont | Specifies font to use when rendering this node |
| | m_sTitle | String name of this node |
| Modifier Operators | SetActive | Set active state |
| | SetFocus | Set focus |
| Selector Operators | IsActive | Return active state |
| | HasFocus | Return focus state |

Table 5 defines a spokes annotation class in accordance with one embodiment for implementing the spokes viewer. The spokes annotation class represents view specific data that is added by a user. The spokes annotation class is a subclass of the spokes node class, thereby allowing the document/view mechanisms to treat annotations much the same as based data derived nodes. The spokes annotation class includes member variables and modifier operations. The member variables and modifier operations, including descriptions, are shown in Table 5.

TABLE 5

| Group | Name | Description |
| --- | --- | --- |
| Member Variables | m_fType | Text, Audio, Video, HTML, URL, OLE, etc. |
| Operators | Draw | Draw a representation of this object |
| | Active | Activate this annotation. For embedded objects (like OLE, URL's) this might entail launching a server or fetching a document |

Figure 12:
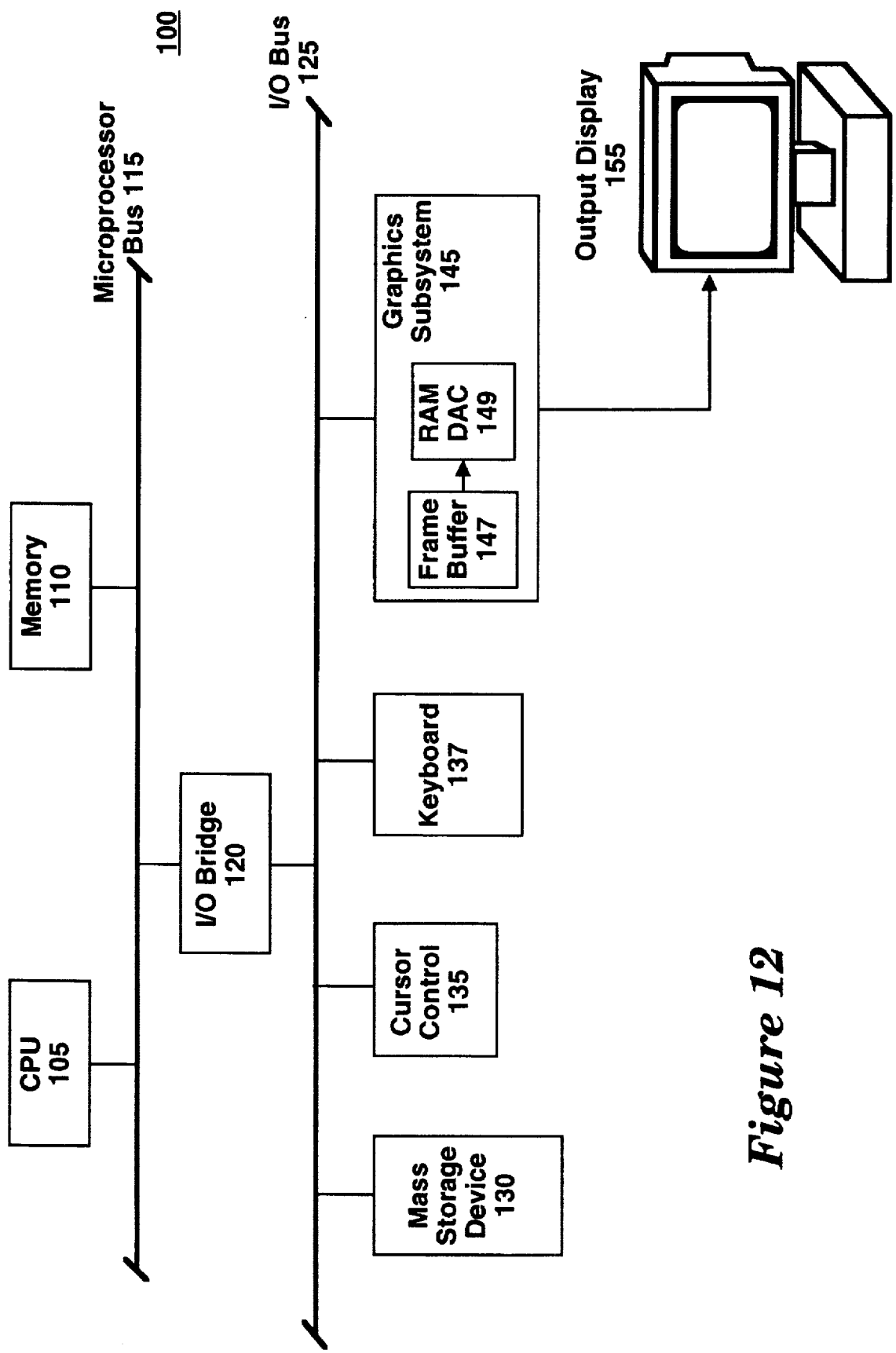
FIG. 12 illustrates a high level diagram of a computer system for displaying datasets in accordance with the spokes viewer of the present invention.

FIG. 12 illustrates a high level diagram of a computer system for displaying datasets in accordance with the spokes viewer of the present invention. A computer system 100 contains a central processing unit (CPU) and a memory 110, coupled via a processor bus 115. In one embodiment, the CPU 105 is an Intel® architecture microprocessor, manufactured by Intel® corporation, the assignee of the present invention. The memory 110 may comprise dynamic random access memory (DRAM) as well as cache memory. The processor bus 115 is utilized to transfer data between the CPU 105 and the memory 110.

The computer system 100 also contains an input/output (I/O) bus 125. A mass storage device 130, cursor control device 135, and input device 137, are coupled to the I/O bus 125. The input device 137 may comprise a keyboard, a pen based input system or other well known devices for entering information into a computer system. The mass storage device 130, cursor control device 135, and input device 137, are those I/O devices typically found contained within a computer system, and these devices are intended to represent a broad category of I/O peripheral devices, which are well known in the art and will not be described further.

In order to display view data in accordance with the spokes viewer of the present invention, the computer system 100 contains a graphics subsystem 145 and an output display 155. The graphics subsystem 145 contains hardware required to drive the output display 155. In one embodiment, the graphics subsystem 145 contains a frame buffer 147 coupled to a random access memory and digital to analog converter (RAM DAC) 149. The frame buffer 147 may be implemented on a video random access memory (VRAM). The RAM DAC 149 both converts pixel data to the appropriate format and generates analog graphics signals to drive the output display 155.

The microprocessor bus 115 is coupled to the I/O bus 125 via an I/O bridge 120. The I/O bridge 120 provides functionality to allow the CPU 105 to interface to the I/O devices contained on the I/O bus 125. For example, the I/O bridge 120 may comprise an I/O bus arbiter and an I/O bus controller. Although the computer system 100 is shown as having a processor bus 115 and an I/O bus 125 coupled via an I/O bridge 120, the CPU 105 and memory 110 may be coupled to the I/O devices by any means. The CPU 105, memory 110, microprocessor bus 115, I/O bridge 120, and I/O bus 125 are intended to represent a broad category of data processing devices which are well known in the art and will not be described further.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for displaying hierarchical datasets on an output display, said method comprising the steps of:

receiving a hierarchical dataset comprising a plurality of base data elements arranged in at least two levels;

generating a plurality of nodes, one for each of said base data elements, wherein said nodes represent view data separated from said base data elements for displaying said hierarchical datasets;

displaying said view data in an acyclic graphical representation, a node representing a first level of said hierarchical dataset being disposed in a center position, and at least one node representing a subsequent lower level of said hierarchical dataset being displayed radially outward from said center position so as to form a spoke about said center position;

receiving an indication from a user to activate a provided select function;

receiving an indication from said user to select at least one node for modification;

modifying said view data of said selected node; and displaying said modified view data by updating said acyclic graphical representation.

2. The method as set forth in claim 1, further comprising the steps of:

receiving input data for adding to said base data elements;

modifying said view data to include said received input data; and displaying said modified view data by updating said acyclic graphical representation.

3. The method as set forth in claim 2, further comprising the step of storing said view data to permit subsequent retrieval and display of said view data.

4. The method as set forth in claim 1, further comprising the steps of:

receiving annotation data for annotating said base data elements;

modifying said view data to include said received annotation data; and displaying said modified view data by updating said acyclic graphical representation.

5. The method as set forth in claim 4, wherein said annotation data comprises text and symbols for annotating said base data elements.

6. The method as set forth in claim 1, further comprising the steps of:

receiving attribution data for attributing characteristics to said base data elements;

modifying said view data to include said received attribution data; and displaying said modified view data by updating said acyclic graphical representation.

7. The method as set forth in claim 6, wherein said attribution characteristics comprise font type, font size, bold text, italic text, and underline text.

8. The method as set forth in claim 1, wherein the step of receiving an indication from the user to activate a provided select function comprises the step of receiving an indication from a user to activate either a provided spokes expand function or a provided spokes contract function;

the step of receiving an indication from the user to select at least one node for modification comprises the step of receiving an indication from the user to select at least one node for expansion/contraction; and the steps of modifying said view data and displaying said modified view data comprise the steps of:

shortening an arc connecting said selected node to said center node if said user indicated activation of said spokes contract function; or lengthening said arc connecting said selected node to said center node if said user indicated activation of said spokes expand function.

9. The method as set forth in claim 1, wherein the step of receiving an indication from the user to activate a provided select function comprises the step of receiving an indication from the user to activate a provided spokes equivalent function;

the step of receiving an indication from the user to select at least one node for modification comprises the step of receiving an indication from the user to select a plurality of nodes for equalizing the selected nodes' associated arcs; and the steps of modifying said view data, and displaying said modified view data comprise the step of:

equalizing arcs connecting said selected nodes to said center node.

10. The method as set forth in claim 1, wherein the step of receiving an indication from the user to activate a provided selection function comprises the step of receiving an indication from the user to activate either a provided spokes connect function or a provided spokes disconnect function;

the step of receiving an indication from the user to select at least one mode for modification comprises the step of receiving an indication from the user to select at least one node for connection or disconnection; and the steps of modifying said view data, and displaying said modified view data comprise the steps of:

disconnecting said selected node from said center node if said user indicated activation of said spokes disconnect function or connecting said selected node to said center node if said user indicated activation of said spokes connect function.

11. The method as set forth in claim 1, wherein said hierarchical dataset comprises a file system for a computer.

12. A computer system comprising:

system memory for storing a hierarchical dataset comprising a plurality of base data elements arranged in at least two levels;

a central processing unit (CPU) coupled to said system memory for receiving said hierarchical dataset and for generating a plurality of nodes, one for each of said base data elements, wherein said nodes represent view data separated from said base data elements for displaying said hierarchical datasets, receiving an indication for activating a provided select function, and in response activating the corresponding provided select function, receiving an indication to select at least one node for modification, and in response, selecting the node for modification, modifying said view data, and displaying said modified view data; and an output display coupled to said CPU for displaying said view data in an acyclic graphical representation, and said modified view data in a modified acyclic graphical representation, a node representing a first level of said hierarchical dataset being disposed in a center position, and at least one node representing a subsequent lower level of said hierarchical dataset being displayed radially outward from said center position so as to form a spoke about said center position.

13. The computer system as set forth in claim 12, further comprising an input device for receiving input data for adding to said base data elements, said CPU modifying said view data to include said received input data, and said output display displaying said modified view data by updating said acyclic graphical representation.

14. The computer system as set forth in claim 13, wherein:

said input device is also used for receiving annotation data for annotating said base data elements;

said CPU is also used for modifying said view data to include said annotation data; and said output display is also used for displaying said modified view data by updating said acyclic graphical representation.

15. The computer system as set forth in claim 13, wherein:

said input device is also used for receiving attribution data for attributing characteristics to said base data elements;

said CPU is also used for modifying said view data to include said attribution data; and said output display is also used for displaying said modified view data by updating said acyclic graphical representation.

16. The computer system as set forth in claim 13, wherein:

said input device is also used for receiving modification input data for modifying said base data elements;

said CPU is also used for modifying said view data to include said modification input data; and said output display is also used for displaying said modified view data by updating said acyclic graphical representation.

17. The computer system as set forth in claim 12, further comprising a mass storage device coupled to said system memory and said CPU for storing said view data to permit subsequent retrieval and display of said view data.

18. The computer system as set forth in claim 12, wherein said hierarchical dataset comprises a file system for a computer.

* * * * *

UNITED STATES PATENT AND TRADEMARK OFFICE
CERTIFICATE OF CORRECTION

PATENT NO.  :  5,615,325
DATED       :  March 25, 1997
INVENTOR(S) :  George H. Peden It is certified that error appears in the above-identified patent and that said Letters Patent is hereby corrected as shown below:

In column 5 at line 56 delete "icon 10," and insert --icon 410,--

Signed and Sealed this

Twenty-second Day of July, 1997

Attest:

BRUCE LEHMAN

*Attesting Officer*    Commissioner of Patents and Trademarks